United States Patent [19]
Sant' Anselmo et al.

[11] Patent Number: 5,331,176
[45] Date of Patent: Jul. 19, 1994

[54] HAND HELD TWO DIMENSIONAL SYMBOL READER WITH A SYMBOL ILLUMINATION WINDOW

[75] Inventors: Robert Sant' Anselmo, West Hills; Carl Sant' Anselmo, Rancho Palos Verdes, both of Calif.

[73] Assignee: Veritec Inc., Chatsworth, Calif.

[21] Appl. No.: 866,059

[22] Filed: Apr. 10, 1992

[51] Int. Cl.⁵ .............................................. G06K 7/10
[52] U.S. Cl. ..................................... 250/566; 235/472
[58] Field of Search ............... 250/556, 555, 566, 233, 250/237 R, 201.7, 203.2, 205; 235/462, 472, 494, 487, 484, 485, 454, 456, 473

[56] References Cited

U.S. PATENT DOCUMENTS

| | | | |
|---|---|---|---|
| 3,502,888 | 3/1970 | Stites | 250/566 |
| 3,961,198 | 6/1976 | Aungst | 250/566 |
| 4,682,016 | 7/1987 | Inoue | 250/566 |
| 5,151,580 | 9/1992 | Metlitsky et al. | 235/472 |

*Primary Examiner*—David C. Nelms
*Assistant Examiner*—Que T. Le
*Attorney, Agent, or Firm*—Staas & Halsey

[57] ABSTRACT

A symbol reader which projects an illumination window or field that is the same size as a field of view of a sensor used to read a symbol. The illumination window is aligned with the field of view of the sensor. The window or field can provide an area of relatively constant illumination or edges of the window or field can be at a higher illumination creating an outline or capture border. The outline alone can be projected when the ambient light level is sufficient for capture of the symbol. The window or field can be created by projecting light from various light sources.

14 Claims, 12 Drawing Sheets

AUTOMATIC MASK FOR RECTANGULAR SYMBOLS

AUTOMATIC MASK FOR SQUARE SYMBOLS

HAND HELD TWO DIMENSIONAL SYMBOL READER WITH A SYMBOL ILLUMINATION WINDOW

CROSS REFERENCES TO RELATED PATENTS AND APPLICATIONS

This application is related to U.S. Pat. No. 4,924,078 and U.S. application Ser. No. 07/485,832 entitled Symbol Reader by James L. Karney filed Feb. 28, 1990 both incorporated by reference herein.

BACKGROUND OF THE INVENTION

1. Field of the Invention

The present invention is directed to a hand held reader used for capturing two dimensional symbols, and, more particularly, to a system in which a target outline is projected by the reader allowing the user to easily position the targeted symbol within the outline for symbol capture.

Description of the Related Art

Two dimensional symbols, such as described in U.S. Pat. No. 4,924,078, can be captured for decoding in a number of different ways. The symbols can be scanned with a laser beam in much the same way that barcode symbols are scanned thereby capturing portions of the symbols sequentially. Such capture systems, if the symbol is moving relative to the capture system, may erroneously read the symbol. The entire symbol can also be captured at one time using an array of sensors such as a CCD array. Capturing all the symbol at the same time avoids the problems of relative symbol movement which occur in the scanned systems. However, positioning the sensor so that all of the symbol is in the field of view of the sensor can be a problem. What is needed is a capture system that allows the user to position the field of view of the sensor to cover the symbol being captured.

SUMMARY OF THE INVENTION

It is an object of the present invention to allow a user to position a symbol reader field of view to cover a symbol being captured.

It is another object of the present invention to provide a simple method of sensor and symbol alignment.

It is also an object of the present invention to provide an illumination window the same shape as the target symbol.

It is a further object of the present invention to provide an illumination window or field that encompasses the area in which a target symbol resides on an object.

It is also an object of the present invention to provide illumination windows of various shapes.

It is still another object of the present invention to simplify and automate capturing a two dimensional symbol using a portable reader that allows capturing the symbol at varying distances from the reader, allows capturing symbols of various sizes and shapes, allow capturing symbols on varying surfaces at various orientations when capture criteria are met.

The above objects can be attained by a symbol reader which projects an illumination window which can be called a field or a frame. The window is preferably approximately the same size as a field of view of a sensor used to read a symbol. The window or field can provide an area of relatively constant illumination or edges of the window or field can be at a higher illumination creating an outline or capture border. The outline alone can be projected when the ambient light level is sufficient for capture of the symbol. The window or field can be created by projecting light from various light sources.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
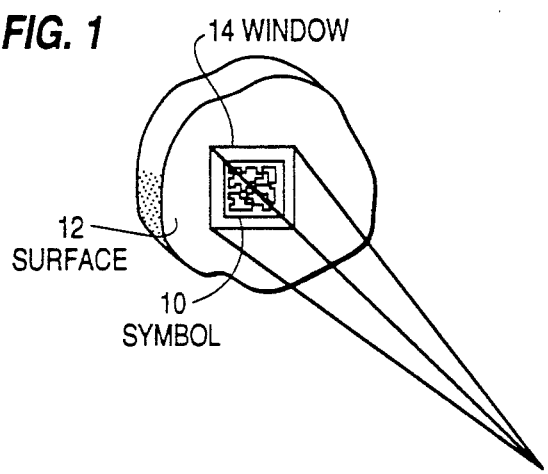
FIG. 1 illustrates a window in accordance with the present invention.

As illustrated in FIG. 1 a symbol 10 such as that described in U.S. Pat. No. 4,924,078 is fixed to or made a part of the surface 12 of an object. To ensure that the symbol is within the viewing range of the detector in a hand held symbol reader, in accordance with the present invention, an illumination window 14 is projected by the hand held reader allowing the user to position the window 14, such that the symbol 10 falls within the window, thereby falling within the capture view range of the sensor, such as a CCD array detector, of the hand held symbol reader. The window 14 can also be used by the user to align the sensor of the reader with the symbol 10 in the most favorable capture position. Even though the symbol described in U.S. Pat. No. 4,924,078 can be captured from an omni directional, three dimensional orientation, the chance for error during image decoding, when is reduced when the sensor and symbol are aligned. Alignment will minimize skew and may eliminate the need for determining symbol image orientation.

Figure 2A:
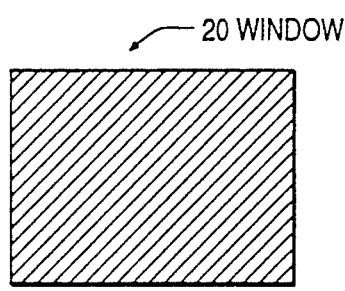
FIGS. 2a-2c depict alternate versions of the window.
Figure 2B:
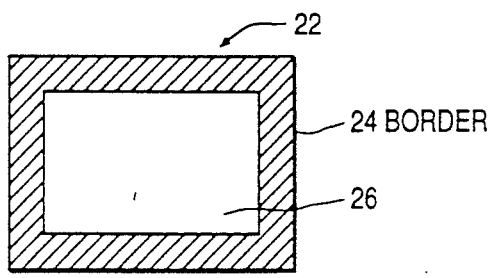
Figure 2C:
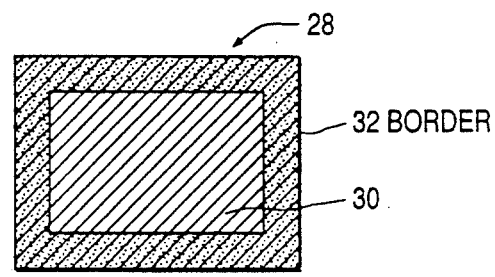

Various versions of the window 14 are illustrated in FIGS. 2a-2c. FIG. 2a illustrates a window 20 in which the entire area of the window 20 is illuminated with light of a substantially constant intensity. The window 20 would typically be used when emphasis on alignment of the symbol with the window 20 is not desired and when different shaped symbols are to be captured. The window 20 should be the same size and shape as the view of the sensor of the reader and should be aligned with the view. However, it is possible for the window to be a different shape and size than that of view of the sensor which would be the case when a rectangular sensor is used with a square symbol and square window.

FIG. 2b illustrates a window 22 which includes a border 24 where the border 24 is created with light of a constant intensity. The interior portion 26 of the window 22 is not illuminated. Window 22 would typically be used when the environmental illumination of the symbol 50 is sufficient for image capture. The interior edge of border 24 should be the same size as and aligned with the view of the sensor of the reader. FIG. 2c depicts a window 28 which is a combination of the windows 20 and 22. In this window the interior portion 30 of the window 28 is illuminated at a constant illumination while the border 32 is at an increased illumination. Window 28 would typically be used when the ambient light for illuminating the symbol is too low for image capture. The inner edge of border 32 should be the same size and aligned with the view of the sensor of the reader.

Figure 3D:
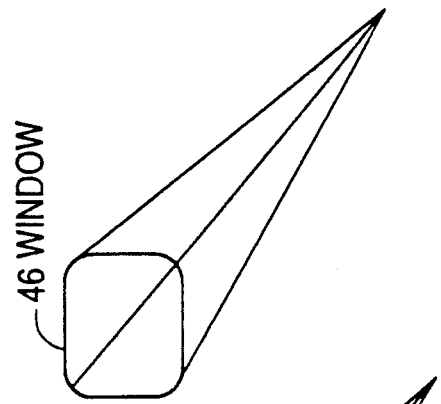
FIGS. 3a-3f illustrate various shapes for the window.
Figure 3C:
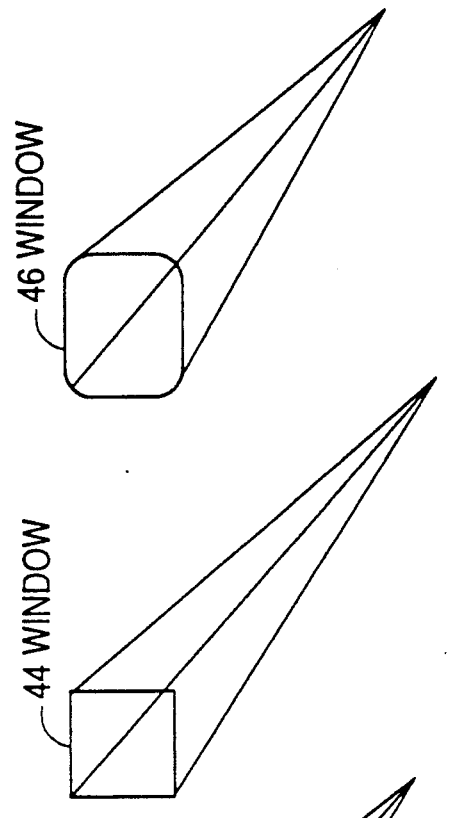
Figure 3F:
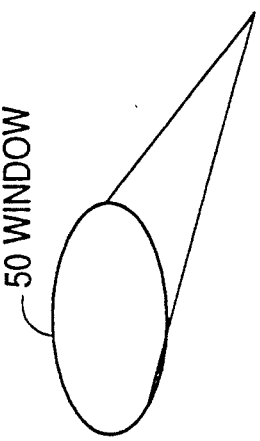
Figure 3B:
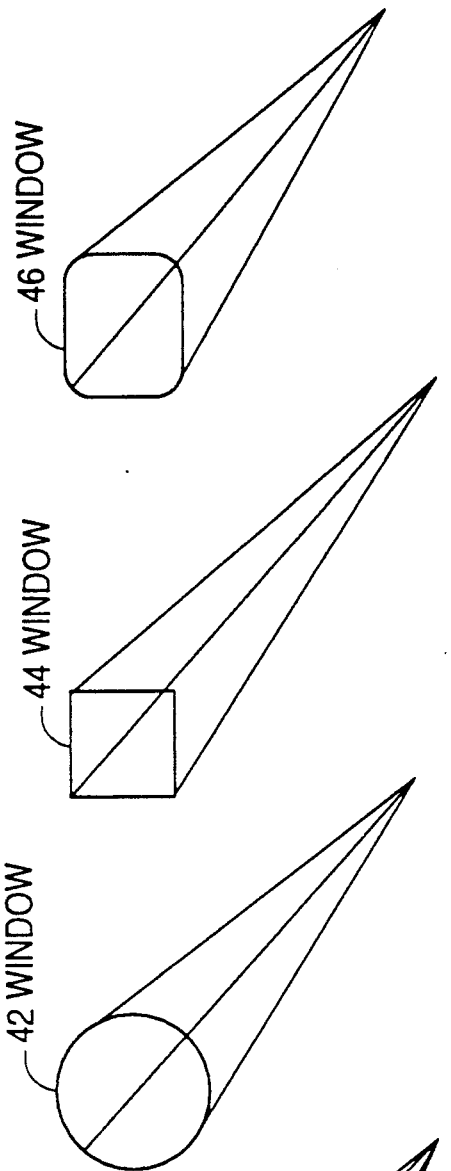
Figure 3A:
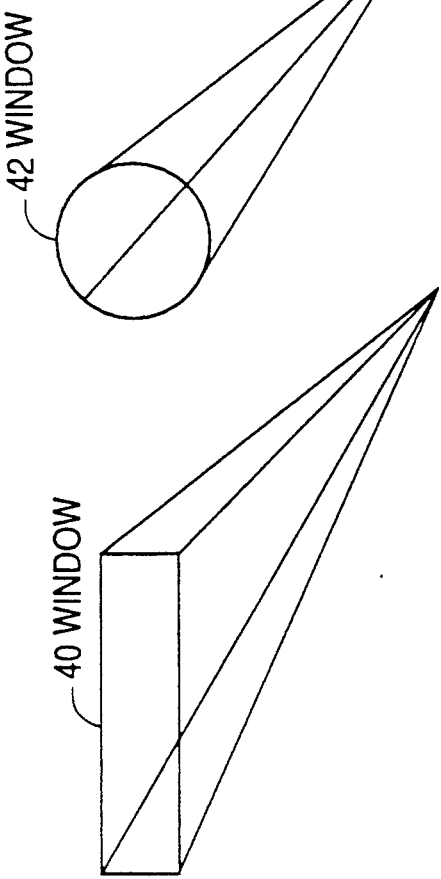
Figure 3E:
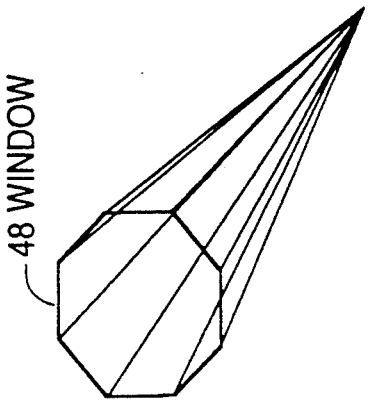

FIGS. 3a–3d illustrate how the target window can have different shapes. FIG. 3a illustrates a window 40 which is rectangular. FIG. 3b illustrates a window 42 circular in shape. FIG. 3c illustrates a square window while FIG. 3d illustrates a polygonal window 46. FIG. 3e illustrates a different polygonal window 48 while FIG. 3f depicts an elliptical window 50. Other shapes of windows are possible such as triangular, freeform and a generalized spot. Of course, the window can be a bordered or non-bordered window.

Figure 4A:
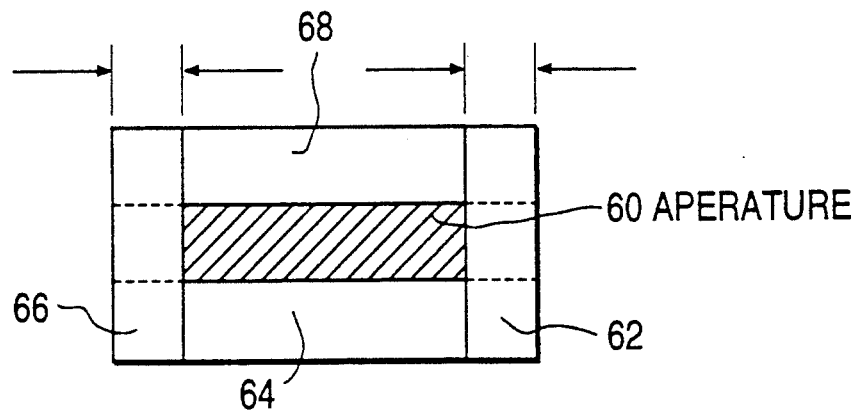
FIGS. 4a-4c illustrate how the size and the shape an aperture for creating the window can be changed.
Figure 4B:
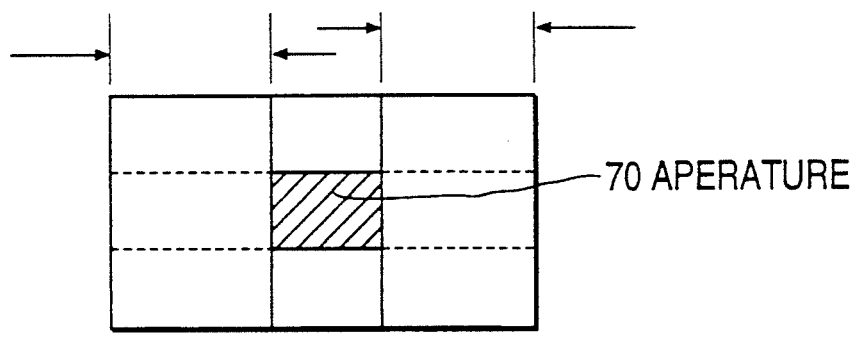
Figure 4C:
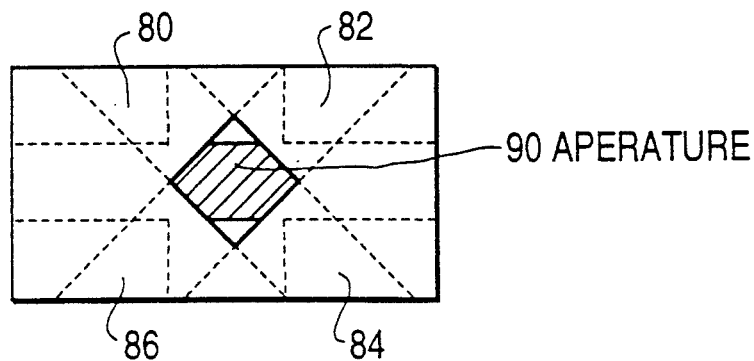

The shape and size of the window can be adjusted, depending upon the shape of the symbol being captured, using an adjustable aperture through which the illumination light is beamed, as illustrated in FIGS. 4a and 4c. The aperture 60 can be adjusted in size by adjusting the relative position of aperture plate 62–68. When the aperture plates 62 and 66 are closed as illustrated in FIG. 4b, the rectangular aperture 60 is converted into a square aperture 70 as illustrated by a comparison of FIGS. 4a and 4b. Additional plates 80–86 positioned at angles with respect to plates 62-68 can be added to the adjustable aperture, so that the shape of the aperture can be reconfigured as illustrated by the polygonal aperture 90 of FIG. 4c. The aperture can be adjustable through a stepper motor control mechanism producing an illumination iris that can be changed in size and/or shape as desired.

Figure 5:
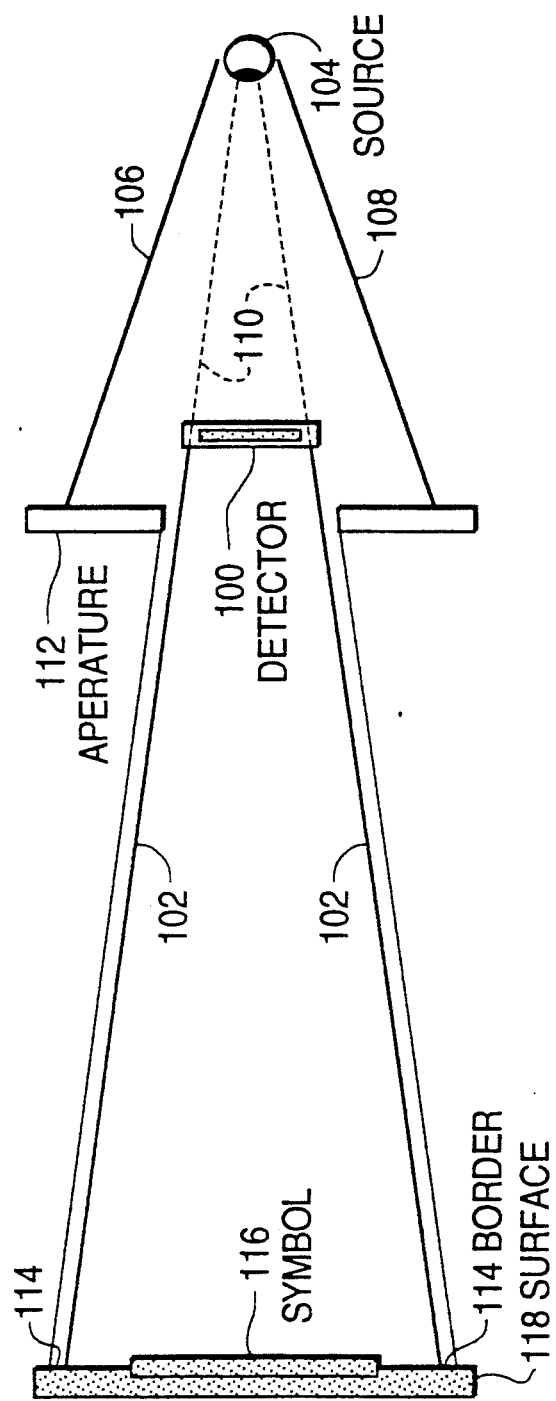
FIG. 5 depicts one arrangement for producing a border or outline type window.

The window 22 with the border, as illustrated in FIG. 2b, can be created in a number of different ways one of which is illustrated in FIG. 5. The view of a sensor or detector 100 is illustrated by the view lines 102. To provide a border, such as border 24, that outlines the view of the sensor 100, a light source 104 is positioned behind the detector 100. The light source 104 can include a parabolic mirror or another focusing device that produces a cone or beam of light as defined by beam projection lines 106 and 108. Because the sensor 100 is positioned within the cone a portion of the light cone is blocked by the sensor 100 as indicated by the dashed lines 110. When an aperture 112 with the same shape as the sensor 100 is positioned in front of the sensor 100 and is slightly larger than the view range of the sensor 100, the aperture 112 and the sensor 100 will combine to create a lighted border 114 which can be projected around a symbol 116 mounted on a surface 118.

Figure 6:
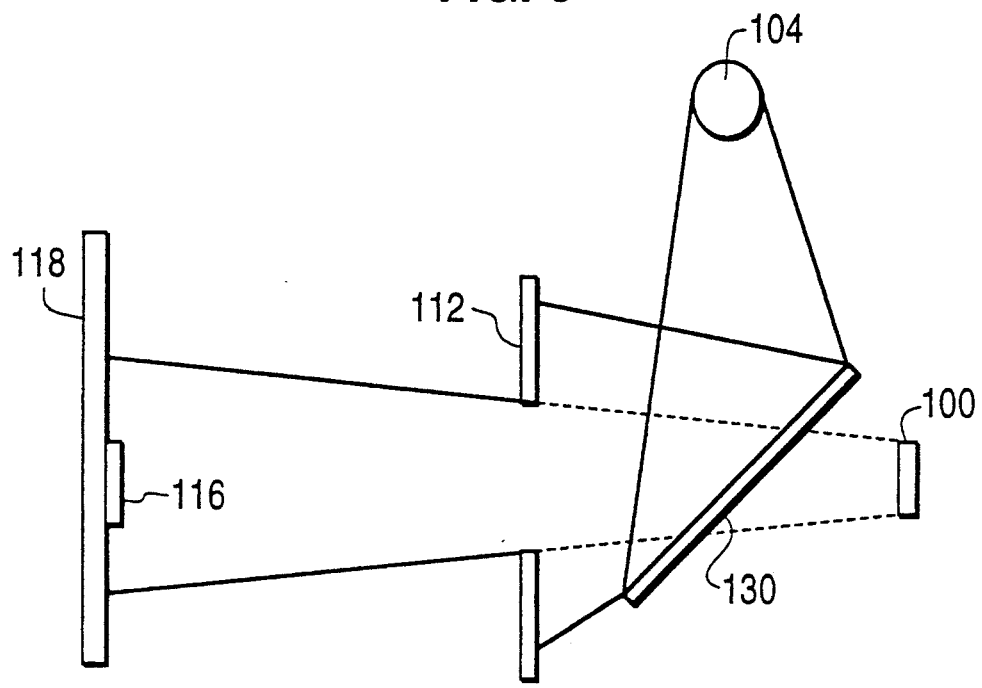
FIGS. 6-9 depict other arrangements for creating windows.

A window 20 of uniform illumination in accordance with of FIG. 2a can be created using an arrangement as illustrated in FIG. 6. The light source 104 projects a cone of light onto a partially reflective mirror 130 which reflects the cone toward the aperture 112. The aperture 112 restricts the cone of light, such that the view of the sensor 100 matches the portion of the light cone projected toward the target 116.

The arrangements of FIGS. 5 and 6 can be combined to create the window 28 of FIG. 2c.

Figure 7:
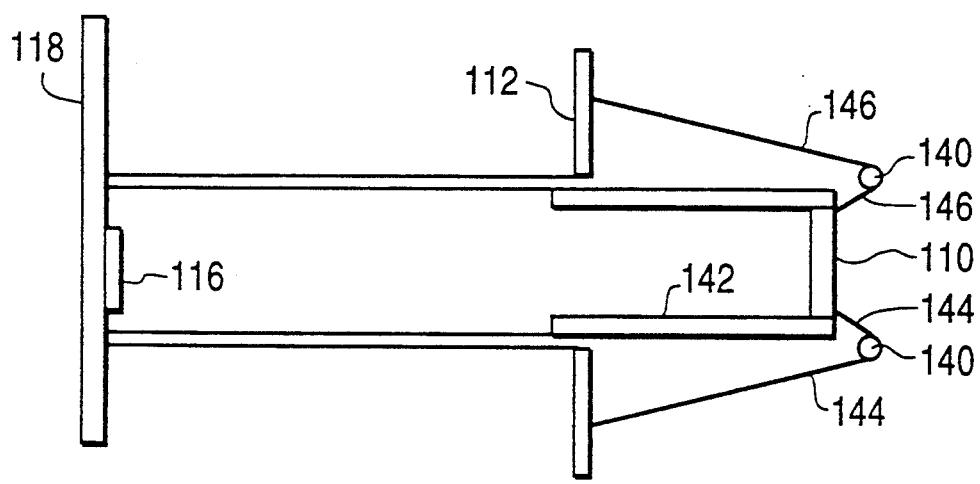

FIG. 7 illustrates a still further arrangement. In this arrangement plural light sources 140, such as light emitting diodes, are arranged around the periphery of the sensor and the view of the sensor 110 is restricted by a tube 142. The tube 142 is the shape of the sensor 110, such as a square. The light sources 140 project light cones defined by projection lines 144 and 146. A portion of each cone is blocked by the sensor 110 and tube 142. Another portion of each cone is blocked by aperture 112 such that a ring or border is created around the symbol 116.

Figure 8:
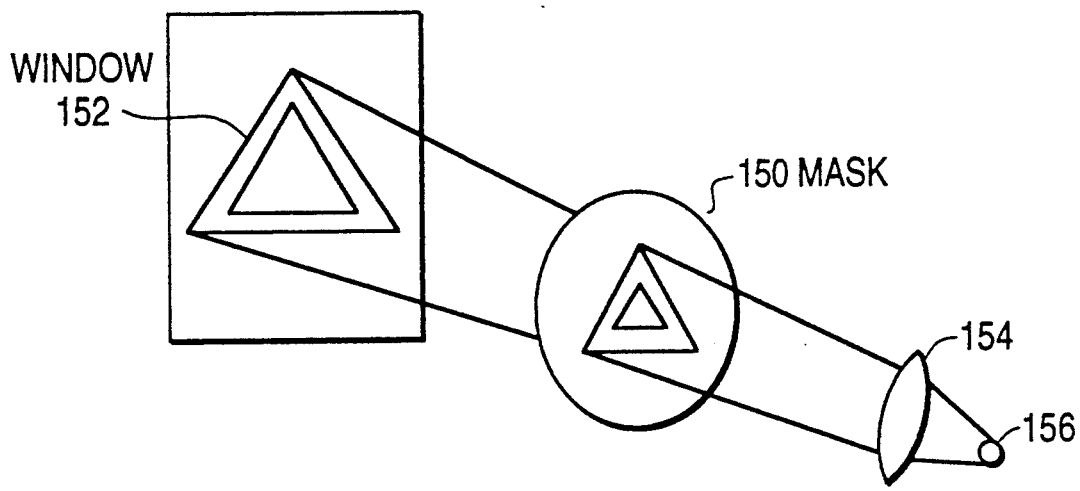

FIG. 8 illustrates a solid mask 150 being used to project a border type window 152 where the window 152 is triangular in shape. A lense 154 focuses the light from light source 156 onto the solid mask which blocks all light from source 156 except the desired pattern for the window.

Figure 9:
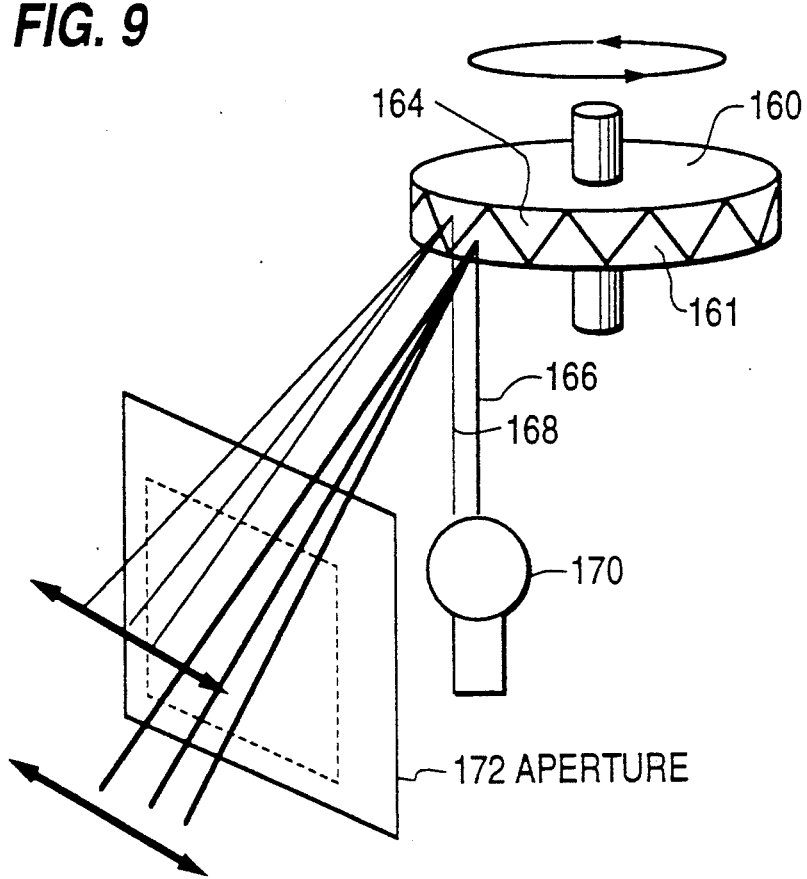

FIG. 9 illustrates a still further method of creating the window with or without a border. In this arrangement a rotating wheel 160 includes a appropriately shaped mirrors 162 and 164. One or more beams 166 and 168 of light from an illumination source 170, such as a laser, are raster scanned by the rotating mirrors to produce the window. The wheel with the mirrors can be located behind the detector 110 as illustrated in FIG. 6 or to one side as illustrated in FIG. 7. An optional aperture 172 can also be provided to restrict the projection of the beams. The window thus created can be like the windows of FIGS. 2a–2c.

Other techniques for creating the window using beams of light include oscillating mirrors and a mask with holes for creating a dotted border.

Figure 10:
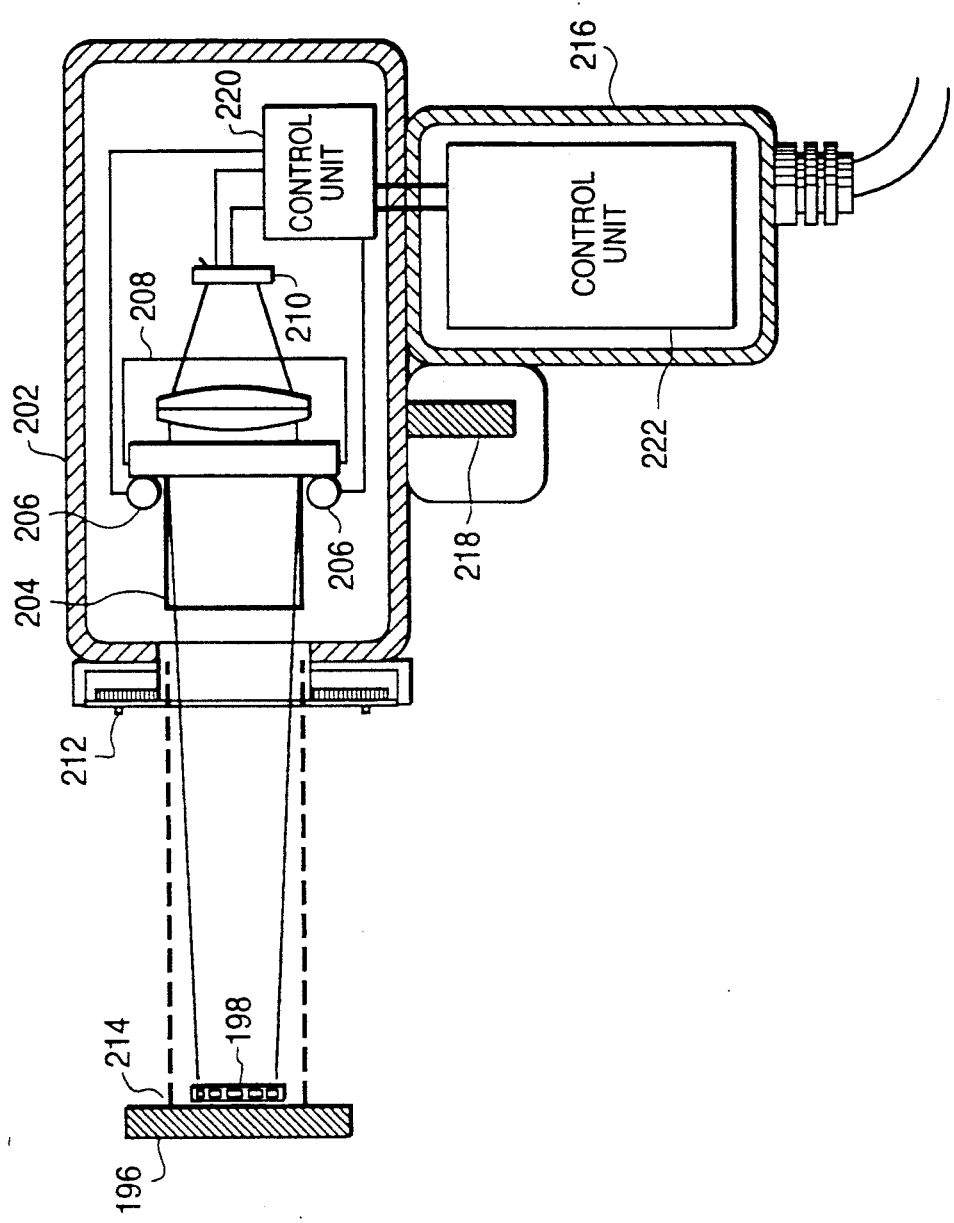
FIG. 10 depicts hand held reader construction.

FIG. 10 illustrates an example of a hand held symbol reader 200. This reader 200 is typically connected to conventional personal computer (not shown) such as an Intel 386 based PC capable of including a conventional video frame grabber board (not shown) such as the high resolution frame grabber DT2851 available from Data Translation, Inc. A conventional RS-170 video output produced by the reader 200 is provided to the frame grabber. The reader 200 includes a case 202 housing the window projection apparatus as well as a portion of the electronics for capturing the symbol 198. The housing includes a glare or baffle tube 204 with light emitting diodes 206 mounted around the exterior of the tube. The tube 204 is mounted on an optics unit 208 which can be used to focus the image of the symbol 198 on the sensor 210. The sensor 110 can be a conventional CCD array or a random access memory as described in the Karney application previously mentioned. The optics can be fixed focus, fixed image size optics providing a fixed depth of field sufficient for the symbol to be in focus in the preferred operating range of the reader (2–14 inches) or automatic focus. The optics can also provide automatic zoom type enlargement in combination with the fixed focus or autofocus optics. The tube 204 along with an aperture 212 project the light produced by the diodes 206 to create a border type window 214. The electronics for image capture and illumination control can also be provided in the unit handle 216. A trigger 218 is used to initiate window projection and when further depressed image capture. The electronic control units 220 and 222 operations under the control of a microcomputer as will be discussed in greater detail later.

Figure 11:
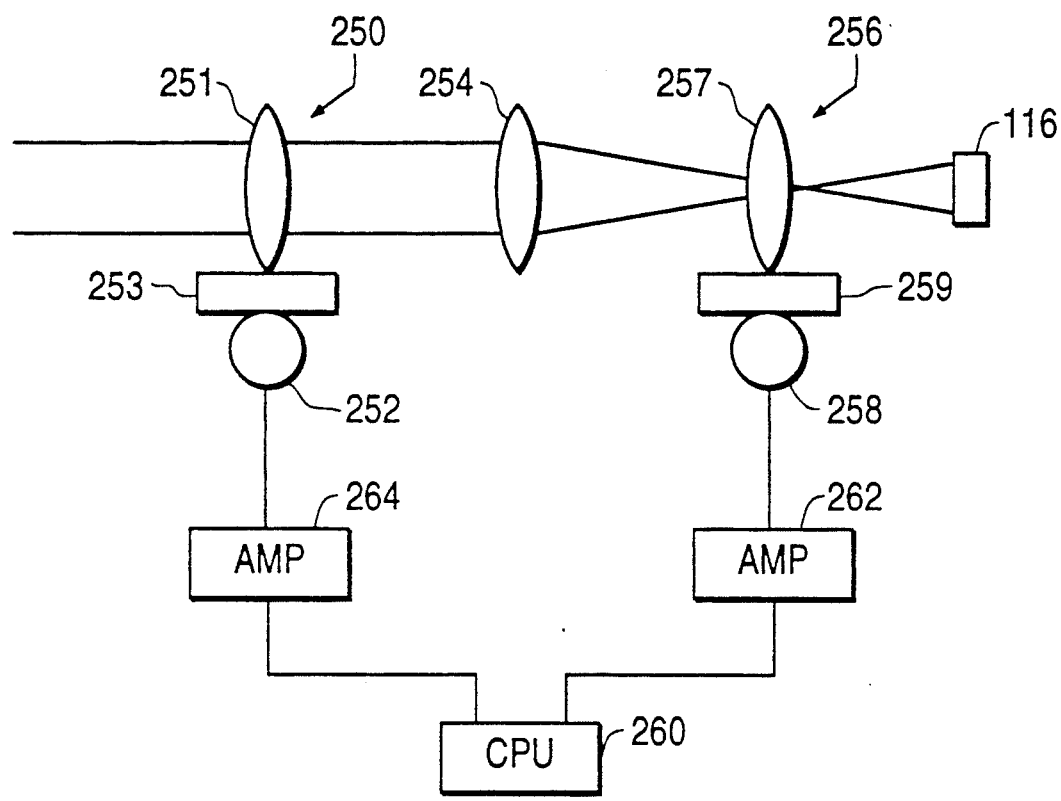
FIG. 11 depicts the optics in greater detail.

FIG. 11 illustrates the optical components of the optics unit 208 in greater detail. The handheld symbol reader includes a capability of performing a conventional autofocus operation at the same time that a conventional zoom operation is performed. The autofocus operation focuses the symbol on the sensor 116, so that each of the data cells are clearly defined on the light sensitive elements. Any of a number of conventional automatic focus methods can be used. For example, the brightness of a central region can be used to determine focus under constant illumination where focus exists when brightness peaks. The techniques used in single lense reflex cameras which balance the brightness of adjacent sensing element lines of the image transmitted through a lense can also be used. Other more sophisticated techniques that use neural networks are also possible. The automatic zoom operation causes the symbol to enlarge, so that it covers a predetermined area of the sensor 116. Any number of conventional automatic zoom operations can be used. It is preferred that the zoom operation take advantage of the characteristics of symbol. The preferred symbol includes a border preferably of dark elements along the periphery of a matrix. When the image of this border falls on the sensing array the sensing elements sensing the border have a low light level compared to the elements sensing the illuminated area adjacent to and outside the symbol the border. To maximize the area of the image of the symbol on the sensor the zoom control enlarges or magnifies the image until one or more sensing elements on the periphery of the sensor sense a reduced light level. The zoom control then backs off the magnification slightly to reduce the size of the image until the one or more peripheral sensing elements detect the higher light level of the area outside the symbol border. The zoom control maintains the size such that the one or more sensing elements interior of the peripheral sensing elements sense the lower light level of the border while the peripheral elements sense the higher light level of the region outside the border. Since the reader is hand held the zoom control will continually hunt for this optimum until the trigger indicates symbol capture is desired. This zoom control technique has the capability of filling the sensor to 99% of the area of the sensor when the sensor is 512 by 512 elements and the sensor and symbol are aligned and to 40% of the area of the sensor when the symbol and sensor are completely misaligned. If a technique which enlarges the image until the peripheral sensing elements sense the low light level is used the sensor fill can be in the range of from 100% to 70%. The zoom operation preferably enlarges the symbol, so that at least 9 pixels of the sensor are shadowed or illuminated by each data cell of the preferred symbol. The optical components include a conventional variable zoom lense 250 system including zoom lense 251 controlled as to its zoom position by a stepper motor 252 and linear actuator 253. An intermediate lense 254 is provided to collimate the view window of the sensor 116 before the image is provided to a conventional variable focus lense system 256 including a lense 257 controlled as to focus by a stepper motor 258 and a linear actuator 259. Other motion devices such as hydraulic actuators could be used. The variable zoom and variable focus systems are controlled by a conventional central processing unit 260 through conventional driving amplifiers 262 and 264.

Figure 12:
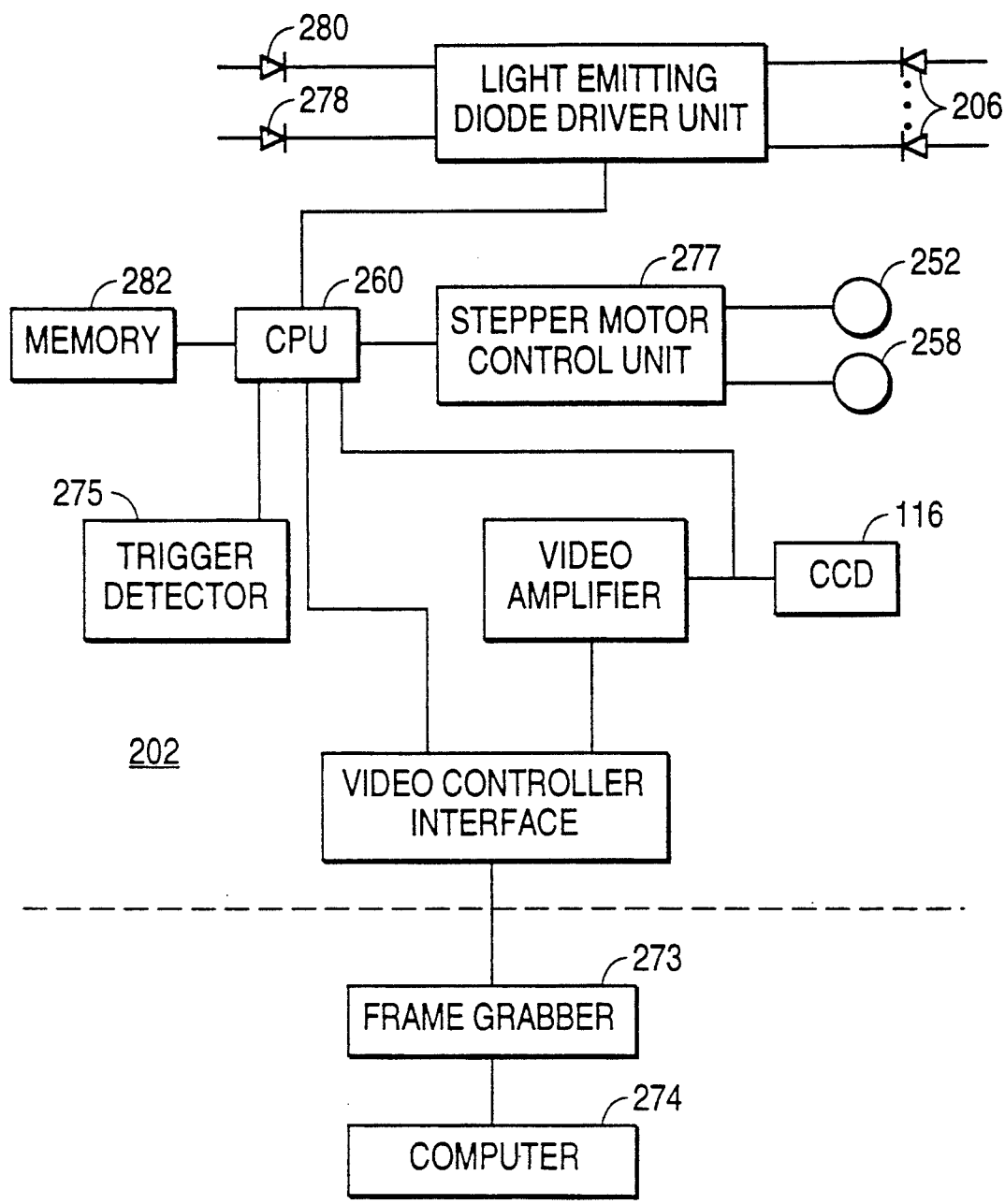
FIG. 12 depicts the electronic components.

FIG. 12 illustrates the electronic components of the reader 202 in greater detail. The output of the CCD sensor 116 is provided through a conventional video amplifier 270 to a conventional video signal controller and interface 272 capable of converting the output from a CCD sensor 116 into a conventional RS-170 video signal transmitted to the frame grabber 273 and computer 274 by a conventional coaxial cable. The output produced by the video signal controller interface 272 is triggered by a trigger position detector 275 detecting the capture trigger position and alerting the CPU 260 which activates the video controller interface 272. The central processor 260 also controls the illumination level of the light emitting diodes 260 by controlling the pulse frequency and duty ratio of the light emitting diodes through a driver unit 276 in a conventional manner. The central processor 260 controls the stepper motors 252 and 256 through a conventional stepper motor control driver unit 277. Of course it is possible, rather than having CPU 260 controlling the stepper motor for focus and zoom control to provide conventional integrated circuit units which automatically perform these operations when initiated by the CPU. The CPU also controls the output of red and green light emitting diodes 278 and 280 which indicate whether the symbol has been captured. A buzzer (not shown) could also be activated to provide an audible indication. The program and the variable data which is used by the CPU 260 to perform the symbol capture operation is stored in a memory 282 which can include both RAM and ROM type memory.

Figure 13:
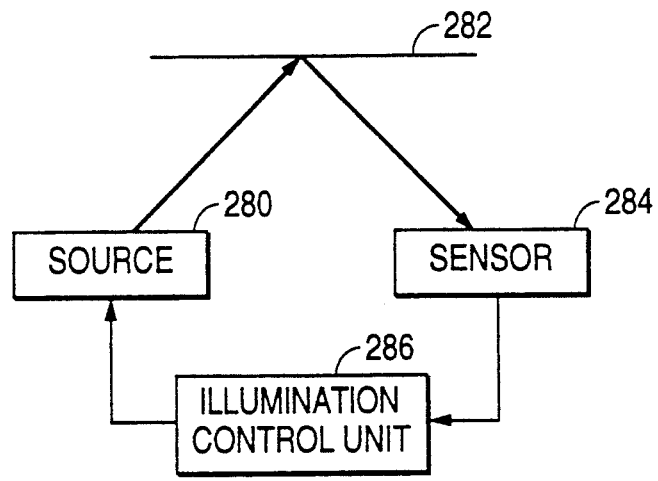
FIG. 13 depicts illumination control.
Figure 15B:
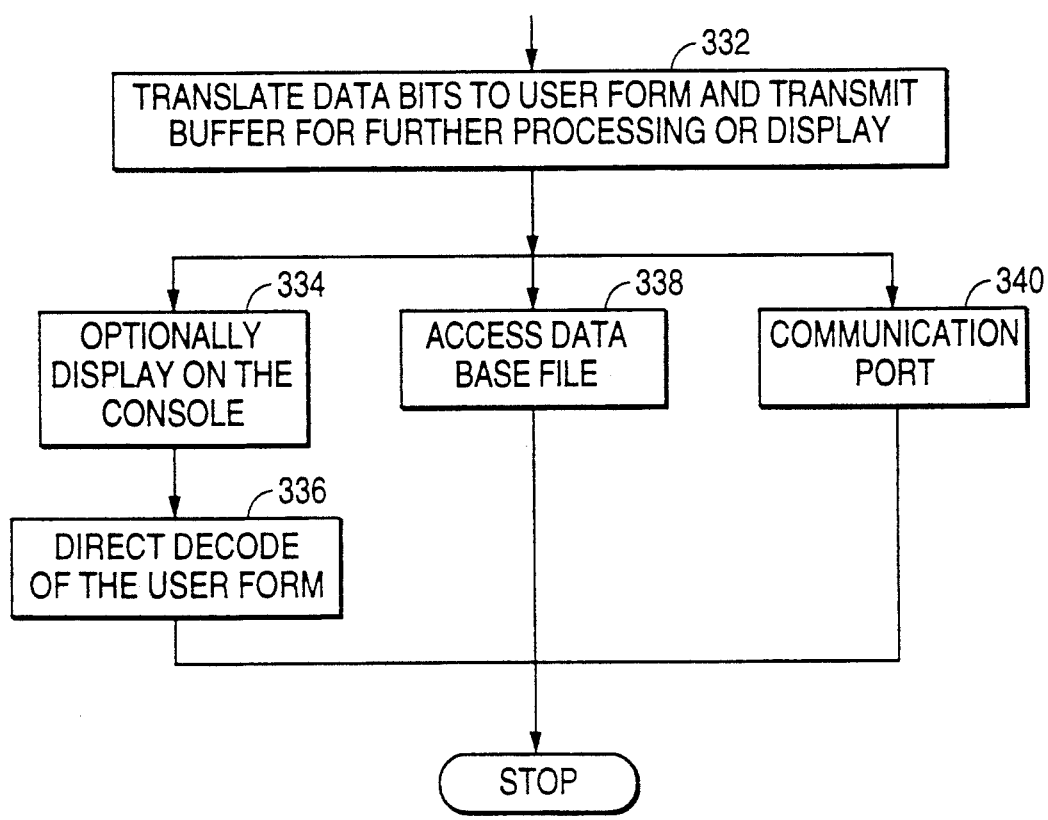
FIGS. 15a-15b depicts the process performed by the computer connected to the reader.

If illumination control is provided by the reader to attain a constant illumination the electronic component arrangement would result in a control loop as illustrated in FIG. 13. In this control loop a light source 280, such as the light emitting diodes, projects light to the target which is reflected back to the sensor 284, such as a CCD array. The light from the sensor 284 is conventionally analyzed by an illumination control unit, which can be computer 260, to determine the brightness of the reflected image. The illumination control unit 286 can average the light produced by all the sensing elements of the sensor 234 to provide an average illumination and then adjust the intensity of the light produced by source 230 to provide an average intensity above a predetermined threshold. If light emitting diodes are used as the source 280, the pulse frequency or the duty ratio of the light emitting diodes can be varied to vary the illumination.

Figure 14:
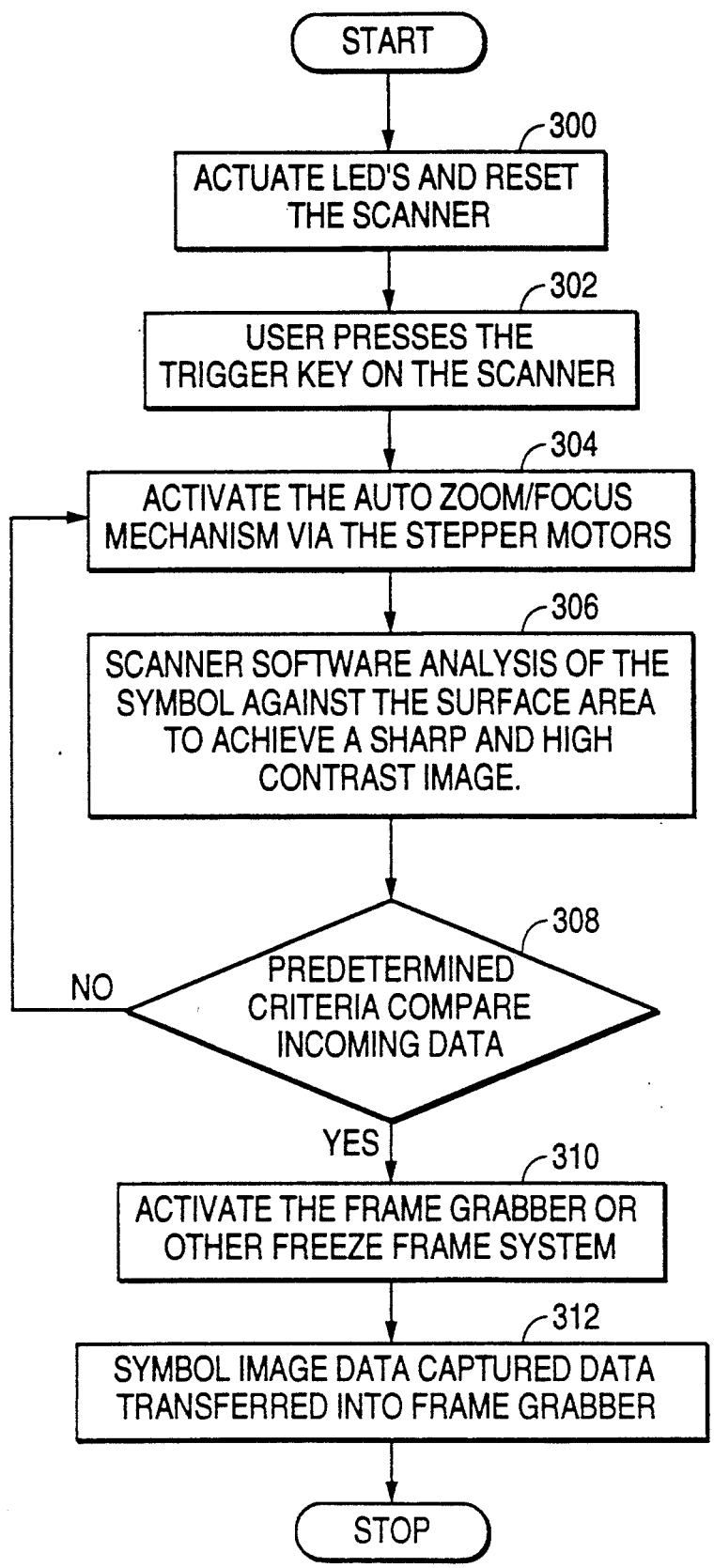
FIG. 14 illustrates the operations of the computer of the reader.

The operations performed by the processor 260 are illustrated in FIG. 14. When the trigger 218 on the unit 200 is partially depressed the light emitting diodes 206 are actuated 300 and the CCD and the variable parameters of the reader are reset. After the LEDs are actuated, the window is projected and used by the user to align the hand held reader with the target symbol. When the user depresses the trigger 218 further and the capture position is detected, the system simultaneously starts 304 the autofocus and autozoom operation. The CPU during the autofocus and autozoom operation analyzes 306 the output of the CCD 116. When the image is in focus and the image has been enlarged sufficiently to fill a predetermined area of the sensor, the predetermined comparison criteria are satisfied 308 and the frame grabber 273 associated with the personal computer 274 is activated 310 followed by a transfer 312 of the captured data to the frame grabber. If a random access memory is used as the sensor, the readout techniques discussed in the Karney application can be used. The light emitting diode indicating successful capture is activated at this time.

Figure 15A:
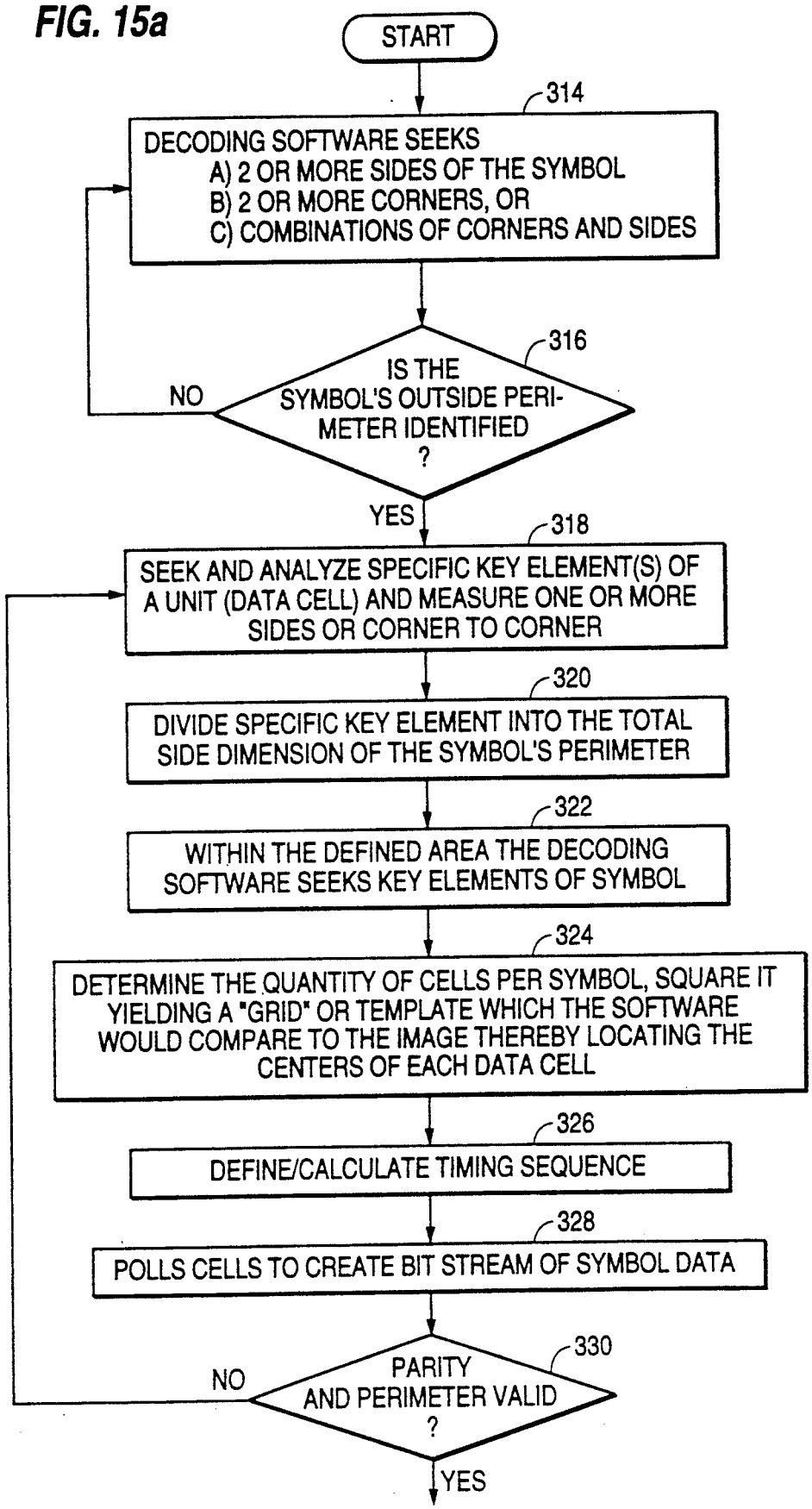

Once the image sensed by the sensor is captured the computer 274 enters a decoding loop, as illustrated in FIG. 15a, in which the orientation of the symbol is determined and the outside perimeter of the symbol is identified 316. The operations described in U.S. Pat. No. 4,924,078 can be performed. The system then enters a loop in which the unique symbol for information identified by the captured symbol is determined. First the system identifies 318 the locations of unit data cells within in the symbol, determines 320 the side dimension of the symbols perimeter. The system then, within the defined parameter of the symbol, determines 322 whether certain key elements of the symbol which can be used for decoding symbol timing exist within the symbol. The system then determines 324 the center of each data cell and calculates 326 a timing sequence. The timing sequence is used to determine the value of each data cell within the symbol by sampling 328 the data cells at the determined timing. Next a determination is made as to whether the parity of the symbol and the perimeter of the symbol are valid. Steps 318–330 can be performed in accordance with the operations described in U.S. Pat. No. 4,924,078. An audio or visual signal by the computer 274 can be provided or a signal sent back to the reader indicating successful capture if desired. If a random access memory is used instead of a CCD, the decoding operations discussed in the Karney application can be used. If the symbol is valid the data is translated 332 into usable bit form and either displayed on the display of the computer 274 or used to access 336 a database or communicated 338 to another device. If displayed on a console the symbol is decoded as to it's representation and the information associated with the decoding is displayed 336. Note that because the border or window when used properly encloses the image of the symbol captured, the window can be used to limit the amount of the captured image that is processed, thereby increasing processing speed.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, a fixed position unit rather than a hand held unit could be used which would require the user to position the symbol on the object containing the symbol within the window. A liquid crystal or light emitting diode display could also be provided which could display the pattern of the image being seen by the CCD sensor to further aid alignment. The illumination and capture operations can be triggered at the same trigger position or the system could automatically activate when removed from a holder. Other symbols such as bar codes and polygonal symbols can be captured. A crosshair type illumination pattern or a dot in the center of the window could also be projected allowing centering of the field of view on the target symbol.

What is claimed is:

1. A symbol illuminator and capture system, comprising:
   a two dimensional sensor for viewing a two dimensional symbol, having a viewing window and capturing an entire symbol image; and
   projection means, associated with said sensor, for projecting two dimensional illumination window for illuminating the entire symbol, the illumination window being equal to or larger in size than and aligned with the viewing window.

2. A system as recited in claim 1, wherein said projection means produces the illumination window with an area of substantially constant area illumination.

3. A system as recited in claim 2, wherein said projection means projects a border surrounding the area, the border having a border illumination higher than the area illumination.

4. A system as recited in claim 1, wherein said projection means produces the illumination window with a border of substantially constant illumination.

5. A system as recited in claim 1, wherein said projection means comprises:
   a light source projecting light; and
   an aperture restricting the light projected by the light source.

6. A system as recited in claim 5, wherein said light source comprises light emitting diodes.

7. A system as recited in claim 6, wherein said projection means further comprises a tube through which said sensor views the symbol and around which said diodes are mounted.

8. A system as recited in claim 5, further comprising a mirror reflecting the projected light through said aperture.

9. A system as recited in claim 5, wherein said sensor is positioned between said light source and said aperture and said sensor blocks a portion of the projected light.

10. A system as recited in claim 1, wherein said projection means comprises means for scanning a beam creating the illumination window via raster scanning.

11. A system as recited in claim 1, wherein said projection means comprises:
    a light source projecting light; and
    a mask blocking the light creating the window.

12. A system as recited in claim 1, further comprising:
    means for automatically focusing the symbol image on the sensor; and
    means for enlarging the symbol image to maximize the area of the sensor covered by the image.

13. A system as recited in claim 12, wherein said means for enlarging uses an image of a border of the symbol to control image magnification.

14. A system as recited in claim 1, wherein said sensor and projection means comprise a hand held symbol reader.

* * * * *

UNITED STATES PATENT AND TRADEMARK OFFICE
CERTIFICATE OF CORRECTION

PATENT NO. : 5,331,176
DATED : July 19, 1994
INVENTOR(S) : Sant'Anselmo et al.

It is certified that error appears in the above-indentified patent and that said Letters Patent is hereby corrected as shown below:

Title Page, Under [56] References Cited, please add the following:
--4,924,078   5/1990    Sant'Anselmo et al.   235/494
  4,965,443   10/1990   Yamasaki et al.       250/201.7
  U.S. Application 07/485,832 filed February 28, 1990
  by Karney entitled Symbol Reader--.
Column 1, line 9, "application" should be
    --Application--.
Column 2, line 19, after "shape" insert --of--.
Column 3, line 64, delete "of".
Column 4, line 24, delete "a" (second occurrence).
Column 5, line 29, delete "the" (second occurrence).
Column 7, line 13, delete "in".

Signed and Sealed this

Twenty-first Day of February, 1995

Attest:

BRUCE LEHMAN

*Attesting Officer*   *Commissioner of Patents and Trademarks*